Sheet 2, 3 Sheets.

R. & A. S. Robins.
Corn Planter.
Nº 91,874. Patented Jun. 29, 1869.

Witnesses.
W. B. Deming
Wm. H. Brereton Jr.

Inventor.
R. Robins & A. S. Robins
by Knight Bros
attys.

Sheet 3. 3 Sheets.
R. & A. S. Robins.
Corn Planter.
No. 91,874.  Patented Jun. 29, 1869.
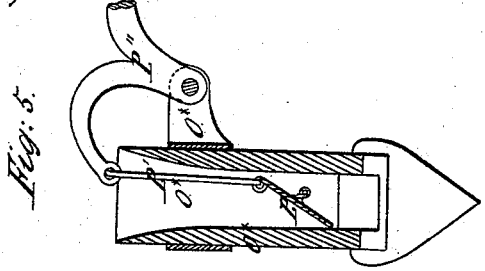
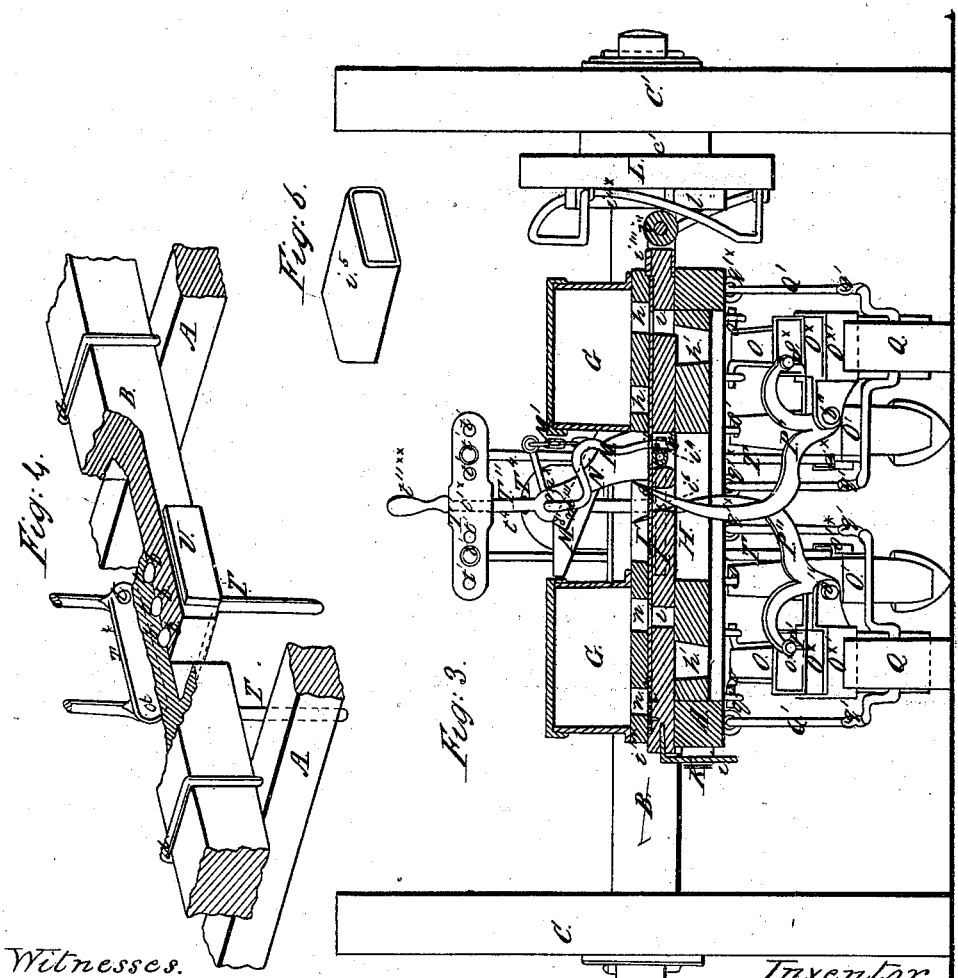
Witnesses.
W. B. Deming
Wm. H. Brereton Jr.
Inventor:
R. Robins & A. S. Robins.
by Knight Bros. attys

United States Patent Office.

REZIN ROBINS AND ALBERT S. ROBINS, OF DUNDAS, ILLINOIS.

*Letters Patent No. 91,874, dated June 29, 1869.*

IMPROVEMENT IN SULKY CORN-PLANTER AND PLOW COMBINED.

The Schedule referred to in these Letters Patent and making part of the same.

*To all whom it may concern:*

Be it known that we, REZIN ROBINS and ALBERT S. ROBINS, both of Dundas, in the county of Richland, and State of Illinois, have invented a new and useful Improvement in Combined Corn-Planters and Plowers; and we do hereby declare the following to be a full, clear, and exact description of the same, reference being had to the accompanying drawings, which are made a part of this specification.

Our invention relates to that class of combined planters and plowers, or cultivators, termed "sulkies;" and consists in certain novel constructions, combinations, and arrangements of parts hereinafter specified.

The machine, in its complete form, furrows, plants, and covers, and is adapted, by the removal or locking of the planting-devices, and a novel adjustment of the machine, to be employed for plowing or cultivating the plants.

The planting-device is adapted to be operated automatically by the movement of the machine, or by the feet of the driver, or be locked from movement by either, when it is not desired to plant.

The plows or shovels are adapted to be elevated separately or simultaneously, and to be held in an elevated position, as in turning and going to and from the field.

The inner shovels are also adapted to be adjusted laterally to dodge the plants in plowing.

The covering-rollers also are adapted to be elevated when desired.

The various adjustments of the planting, covering, and plowing-devices, are adapted to be made from the driver's seat in the most convenient manner.

In the drawings—

Figure 3 is a rear elevation of the machine, with certain parts removed and others in vertical section on the line $y\ y$, fig. 1.

Figure 4 is a sectional perspective view, on an enlarged scale, of a portion of the axle and its adjuncts, representing the provision for adapting the machine for planting or plowing.

Figure 5 is a sectional end view, on about the same scale as fig. 4, of one of the "planting-plows" and its adjuncts.

Figure 6 is a perspective view of the thimble employed to cover the roller of the planting-slide when it is operated "by foot."

A may represent a rectangular frame, suspended by means of staples $a$ from an axle, B, which is supported on a pair of wheels C C' in the usual manner.

D represents a tongue or draught-pole "gained" into the frame A, so as to form a part thereof, and attached separately to the axle B by a vertical bolt, $a'$, and also to the front end of the frame A by a bolt, $a''$.

E represents a driver's seat, which is mounted at the rear end of the frame A on a spring, F, in the usual manner.

G G represent a pair of seed-boxes or hoppers, of suitable capacity, and any desired form, and supported on the frame A immediately behind the axle B, as shown, or in other convenient position, through the medium of a base or bottom H.

Figure 1:
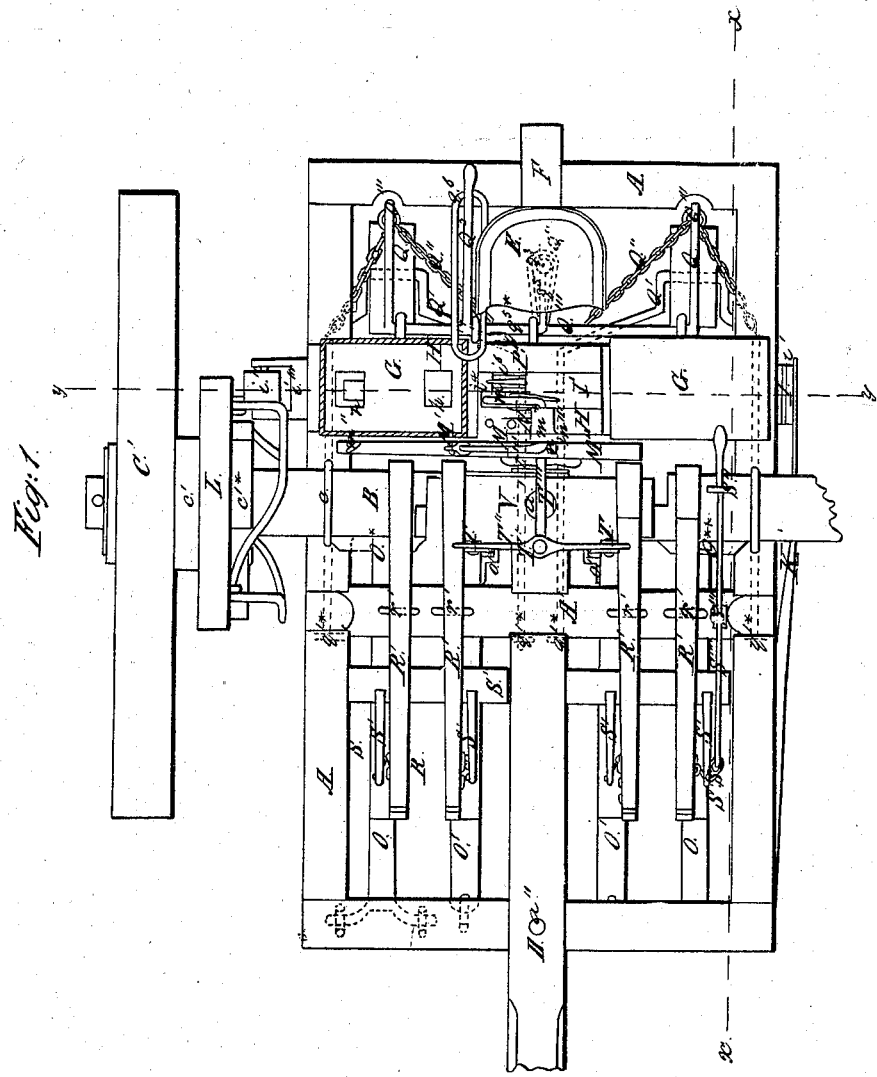
Figure 1 represents a plan view of our improved machine, partly in horizontal section, and with portions of the tongue and axle, with one of the wheels broken away.
Figure 2:
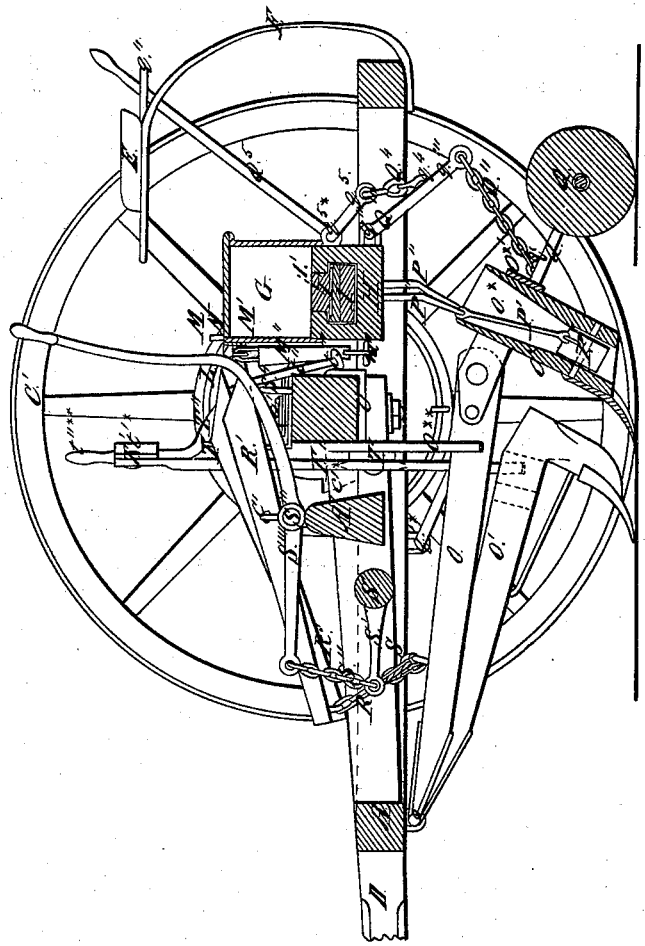
Figure 2 is a longitudinal section of the machine on the line $x\ x$, fig. 1.

This base is provided, under each seed-box, with vertical perforations $h\ h\ h'$, as represented in figs. 1 and 3, and is also perforated longitudinally, transversely of the machine, as shown in figs. 2 and 3, for the reception of a dropping-slide, I, provided with a single perforation, $i$, under each feed-box, which, by the reciprocation of said slide, are made to communicate alternately with one of the holes $h$, and the hole $h'$ in the bottoms of the seed-boxes, thus dropping once for each movement.

The slide I is covered with a thin plate, I' preferably of metal, perforated similarly thereto, and which being made adjustable by the provision of a number of perforations $i^*$ for the reception of its attaching-pin $i'^{**}$, as represented in fig. 3, serves to regulate the number of grains dropped, as desired.

Said slide is also provided at one end with a depending arm, $i'$, through which it is engaged by a spring, K, having a tendency to hold it in the position represented, and at its opposite end with a friction-roller, $i''$, mounted in a detachable cap, $i'''$, and which forms the bearing-surface for a crown-cam, L, by the rotation of which, in connection with said spring K, a constant reciprocating movement is imparted to said slide.

The cam L is mounted loosely on the extended hub $c'$ of the wheel C', and may be constructed as represented, by the attachment of a suitably bent wire to the face of a wooden disk, or in any other suitable manner.

It is connected with the wheel C', in the forward movement of the machine, by the engagement of a spring pawl, $l$, attached thereto, with a ratchet-disk, $c''$, attached to the face of the hub $c'$, said connection preventing the motion of the wheel being imparted to it in any backward movement of the machine.

The dropping-slide I is further provided with a friction-roller, $i^4$, arranged in a slot therein between the seed-boxes, for the engagement of the end $m$, of a bent bell-crank lever, M, fulcrumed at $m^*$ in a standard N on the bed-piece H of the seed-boxes, and connected by a chain, M', to a lever or treadle, M'', fulcrumed at $m''$ in the frame A, and adapted to be operated by the feet of the driver, to reciprocate said slide independent of the motion of the cam L, or by its depression to hold said slide from movement, it being adapted to be held in that position by the engagement of a bearing-plate, $m'''$, thereon with a catch, $n$, on the face of the standard N.

When the slide I is operated "by foot" through the devices last described, its friction-roller $i''$ for the engagement of the cam L is removed, and its end covered by a thimble, $i^5$, fig. 6, to protect the same.

O O, O' O' represent two pairs of shovels or plows hinged to the front end of the frame A by stiff and swivel-joints, $o\ o'$, respectively, the latter pair O being constructed, and both arranged in the usual manner.

The "knees" O* of the shovels or plows O, are constructed as represented in figs. 2, 3, and 5, with flaring cavities or chambers $O^x$, into which the seed is discharged from the slide I, the passage of the seed therethrough being regulated by pivoted valves P, actuated, through connecting-rods P', by bent rock-levers P'', fulcrumed at $p''$ in brackets $O^x$, and engaging direct with the dropping-slide I, in a central slot or slots, $i^6$, therein.

Q Q represent covering-rollers, which are mounted in frames Q', pivoted at $q'^*$ to the main frame A, and arranged directly behind the planting-shovels or plows O, as represented in figs. 1 and 3, to close up the furrows over the seed.

They are adapted to be elevated, when desired, by connection, by means of a chain, Q'', attached to eyes or staples $q'$, on their frame Q', to the arms $q'''$ of a rock-shaft, Q''', hinged at $q'''^*$ to the base H of the seed-boxes, and connected in turn by chain or link, $Q^4$, attached to a central arm, $q^4$, thereof, and to an arm, $q^5$, of a rock-lever, $Q^5$, also fulcrumed, at $q^{4*}$ to said base H, and held at its upper end in a loop or bracket, $q^6$, on the side of the driver's-seat E, where it may be conveniently reached and actuated as desired. The lever $Q^5$ is held, to retain the rollers in their elevated position, by engaging with the front edge of the seat E.

The shovels or plows O O' are connected, at a suitable point behind their pivots, by chains R to the front ends of a corresponding number of levers or treadles R', fulcrumed at $r'$ to a cross-bar, A', of the frame A, and having their free ends in convenient positions for the engagement of the driver's feet.

Said shovels or plows are further connected at the same or other suitable point, by cords, rods, or chains S, to the arms $s'$, of a rock-shaft, S', mounted transversely of the frame A, in front of the bar A', or in other convenient position, and connected by a chain, S'', attached to one or more of said arms $s'$, or to an additional arm or arms, to the end of a rock-lever, S''', fulcrumed at $s'''$ on the bar A' of the frame A, or in other convenient position, its rear end extending to within convenient reach of the driver's-seat.

A catch, $s^4$, on the upper side of the axle B, or at other convenient point, by engagement with said lever S''' when in its depressed position, serves to retain the shovels or plows in an elevated position.

The shovels or plows O are supported laterally, besides, by the form of their pivots $o$, as before described, by rigid depending rods or fingers $O^{**}$ attached to the front edge of the axle B, or other convenient point.

The shovels or plows O' are provided on their inner sides with staples $o'^*$, for the engagement of the lower ends of two upright rods or levers T, connected at their upper ends by a bar or link, T', and fulcrumed at an intermediate point, $t$, to a bar or plate, $T^*$, secured transversely of the tongue D.

The bar or link T' is provided with a number of perforations, $t'$, to admit of the lateral adjustment of said rods, and with a central socket, $t^*$, for the reception of the upper end of a lever, T'', by which to move said rods.

Said lever is fulcrumed at $t''$ on the axle B, or at other convenient point, and is provided at its lower end with pedals or foot-rests $t''^*$ for the engagement of the driver's feet, and also, if desired, above the bar T', with a handle, $t''^{**}$, for the engagement of the hand of the driver.

It is held in its normal position by engaging with a central notch, $t^4$, in a bracket, $T^4$, projecting upward from the axle B.

The object of these devices is to adapt the inner plows, which straddle the row to be "dodged," so as to escape plants which may be out of line, or be held in a normal position, as desired, and also to adjust said plows to suit the row.

By the described arrangement the shovels are adapted to be controlled by either the feet or hand of the driver, as may be most convenient, and also to be expeditiously and permanently adjusted to any desired distance apart, and locked in a central position, as desired.

In changing the use of the machine from plowing to cultivating, and *vice versa*, it is desirable to vary the width of the machine. To accomplish this, the axle B is divided, as represented in fig. 4, at the point where the tongue D is attached to it, and the adjoining faces of the two parts are provided with a number of vertical grooves, $b$, forming, when brought together, as represented, sockets for the reception of the bolt $a'$, by which said attachment is made.

By the adjustment of the two parts past each other, several successive holes or sockets are formed by the registering or uniting of different grooves in the faces of the two parts of the axle.

By the insertion of the bolt, at the same point, through one or the other of these holes or sockets, the length of the axle is determined.

The axle at this point rests in a guide or supporting-plate, U, supported on the tongue D, and is covered by a corresponding plate, V, through both of which also the bolt $a'$ passes.

The devices for elevating the shovels or plows, and the covering-rollers, are omitted in fig. 3.

Instead of the chains specified and represented as connecting the various operating parts of my machine, rods or cords may be substituted where applicable, and *vice versa*.

The precise forms and proportions named and represented for the various parts may also obviously, in many instances, be varied without changing the results produced.

The several parts of the machine may be made of any suitable material.

Having thus described our invention,

What we claim as new therein, and desire to secure by Letters Patent, is—

1. The combination with the axle B, constructed in two overlapping or scarfed parts, of the grooves $b\ b$, bolt $a$, supporting-plate U, and tongue C, arranged substantially as represented and described, for the purpose set forth.

2. The combination of the rods or levers T T, the connecting-bar T', the bent lever T'', provided with the pedals $t''^*$, and the catch $T^4\ t^4$, all constructed, arranged, and operating as described, to dodge the inner plows, or hold the same in their proper normal position, as set forth.

3. In combination with the shovels or plows O O', and devices R R', for operating said plows separately, the levers S''', rock-shaft S'' S, and catch $s^4$, for raising said plows simultaneously, and holding them in an elevated position, substantially as described 4. The combination, with the dropping-slide I, of the spring K, the rock-lever M, chain or rod M', lever or treadle M", and catch n, all arranged to operate substantially in the manner described, for the purpose specified.

5. In combination with the dropping-slide I, operating substantially as herein described, the thimble i', as and for the purpose set forth.

6. The combination and arrangement of the plows O O', adapted to be separately and simultaneously elevated, and the former to be dodged; the seed-boxes G G, the dropping slide I, adapted to drop the seed in variable quantity, and to be operated from the ground-wheels of the machine, or by the foot of the driver, or locked from movement; the valves P P, arranged in the knees of the furrowing-plows, and operated by the dropping-slide, and the covering rollers Q Q, adapted to be elevated when desired, all substantially as and for the purposes herein shown and described.

To the above specification of our improvement in combined corn-planters and plowers, we have signed our hands this 20th day of February, A. D. 1869.

REZIN ROBINS.
ALBERT S. ROBINS.

Witnesses:
H. W. WHITE,
K. N. WHITE.